(12) United States Patent
MacLachlan et al.

(10) Patent No.: US 8,881,890 B2
(45) Date of Patent: Nov. 11, 2014

(54) CONVEYOR BELT MODULE WITH FIXED AXLES

(75) Inventors: Gilbert J. MacLachlan, Harahan, LA (US); David C. Weiser, River Ridge, LA (US); Abraham L. Miller, Gulfport, MS (US); Errol P. Knott, Gonzales, LA (US); Timothy J. DeRoche, Harahan, LA (US); Jude G. Martin, Laplace, LA (US)

(73) Assignee: Laitram, L.L.C., Harahan, LA (US)

( * ) Notice: Subject to any disclaimer, the term of this patent is extended or adjusted under 35 U.S.C. 154(b) by 135 days.

(21) Appl. No.: 13/327,429

(22) Filed: Dec. 15, 2011

(65) Prior Publication Data

US 2012/0298487 A1 Nov. 29, 2012

Related U.S. Application Data

(63) Continuation-in-part of application No. 13/113,538, filed on May 23, 2011, now Pat. No. 8,496,105.

(51) Int. Cl.
*B65G 17/24* (2006.01)
*B65G 17/40* (2006.01)
*B29C 45/16* (2006.01)
*B29C 37/00* (2006.01)
*B29C 45/14* (2006.01)

(52) U.S. Cl.
CPC ............... *B65G 17/24* (2013.01); *B65G 17/40* (2013.01); *B29C 37/0082* (2013.01); *B65G 2207/30* (2013.01); *B29C 45/1615* (2013.01); *B29C 2045/14131* (2013.01); *B29C 45/14426* (2013.01)
USPC .......................................... 198/779; 198/853

(58) Field of Classification Search
USPC ..................... 198/779, 850, 851, 853; 193/37
See application file for complete search history.

(56) References Cited

U.S. PATENT DOCUMENTS

| | | | |
|---|---|---|---|
| 3,870,141 A | 3/1975 | Lapeyre et al. | |
| 4,681,203 A * | 7/1987 | Kornylak | 193/35 R |
| 4,832,183 A | 5/1989 | Lapeyre | |
| 4,993,540 A | 2/1991 | van Capelleveen | |
| 6,367,616 B1 * | 4/2002 | Lapeyre et al. | 198/779 |
| 6,494,312 B2 * | 12/2002 | Costanzo | 198/779 |
| 6,681,922 B2 * | 1/2004 | Corley et al. | 198/853 |

(Continued)

FOREIGN PATENT DOCUMENTS

| | | |
|---|---|---|
| CA | 1198999 A1 | 1/1986 |
| EP | 1316519 A2 | 6/2003 |

(Continued)

OTHER PUBLICATIONS

International Search Report and Written Opinion of the International Searching Authority, PCT/US2012/038821, mailed Jan. 23, 2014, European Patent Office, Rijswijk, NL.

*Primary Examiner* — Gene Crawford
*Assistant Examiner* — Keith R Campbell
(74) *Attorney, Agent, or Firm* — Catherine M. Bishop

(57) ABSTRACT

A modular roller-top conveyor belt and rollers for the belt. The roller-top belt has axles that are fixed relative to the module body. Each of the pieces of the multi-piece rollers can be installed radially onto an axle and joined together in a puzzle pattern to form a complete roller that can rotate on the axle. Parallel ridges extending across the width of the modules add stiffness to the belt.

34 Claims, 20 Drawing Sheets

(56) References Cited

U.S. PATENT DOCUMENTS

| | | |
|---|---|---|
| 6,874,617 B1 | 4/2005 | Layne |
| 6,986,420 B2 * | 1/2006 | Weiser et al. ................ 198/853 |
| 7,137,505 B2 * | 11/2006 | Stebnicki et al. ............ 198/850 |
| 7,216,759 B2 * | 5/2007 | Rau et al. ..................... 198/853 |
| 7,249,671 B2 * | 7/2007 | Riddick et al. ........... 198/457.05 |
| 7,331,448 B2 * | 2/2008 | Stebnicki et al. ............ 198/853 |
| 7,527,143 B2 * | 5/2009 | Krisl et al. ................... 198/779 |
| 7,537,106 B2 * | 5/2009 | Fourney ....................... 198/779 |
| 7,540,368 B2 | 6/2009 | Weiser |
| 7,556,136 B2 * | 7/2009 | Marshall et al. ......... 198/370.09 |
| 7,556,142 B2 * | 7/2009 | Stebnicki et al. ............ 198/778 |
| 7,886,892 B2 | 2/2011 | Fourney |
| 8,424,675 B2 * | 4/2013 | Rau .............................. 198/779 |
| 2006/0130262 A1 * | 6/2006 | Visk et al. .................. 15/230.11 |
| 2011/0073442 A1 * | 3/2011 | Rau et al. .................... 198/617 |

FOREIGN PATENT DOCUMENTS

| | | |
|---|---|---|
| EP | 1437312 A1 | 7/2004 |
| EP | 1616818 A1 | 1/2006 |
| WO | 2008052373 A1 | 5/2008 |
| WO | 2010008756 A1 | 1/2010 |

* cited by examiner

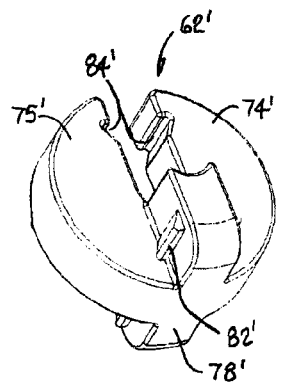
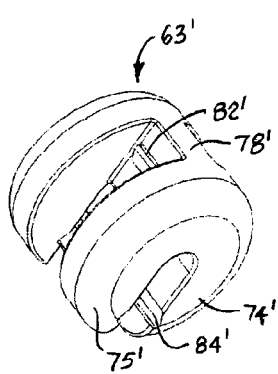
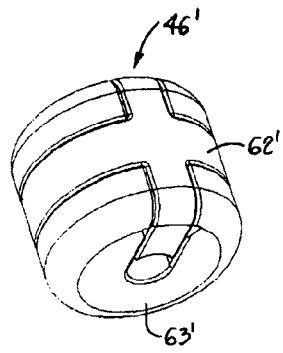
FIG. 18A     FIG. 18B     FIG. 18C
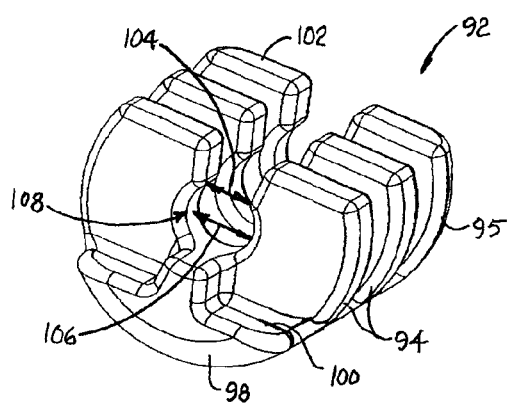
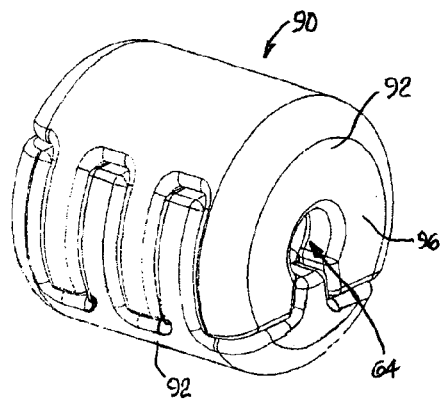
FIG. 19A     FIG. 19B
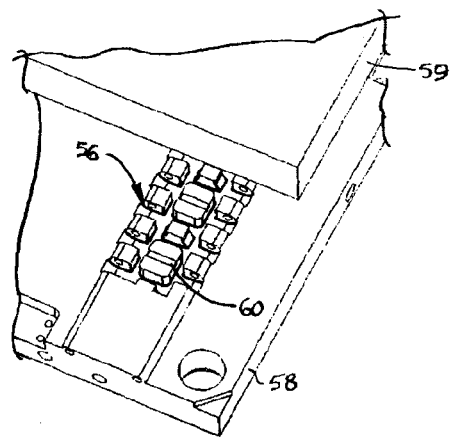
FIG. 5

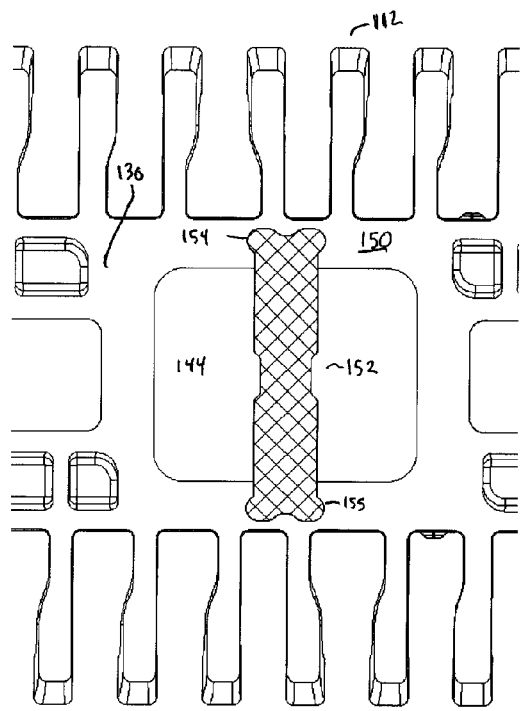
FIG. 7B
FIG. 8
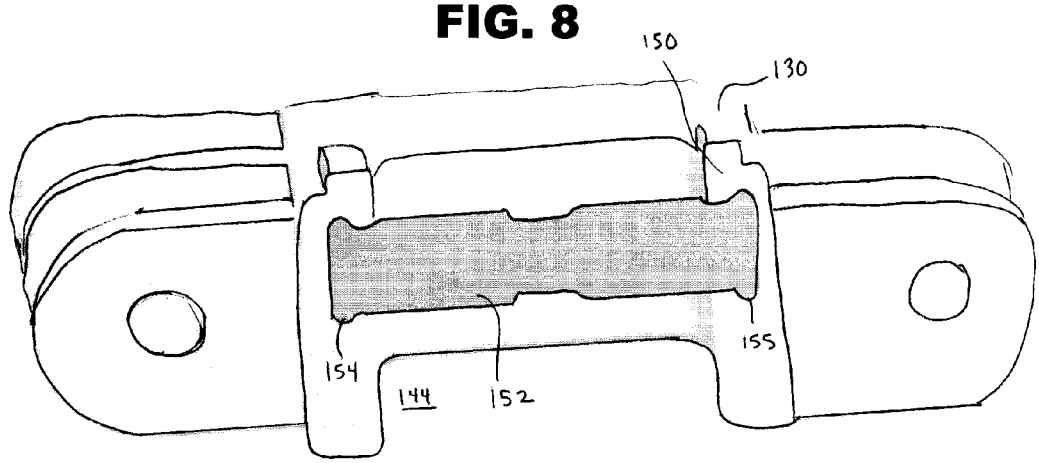

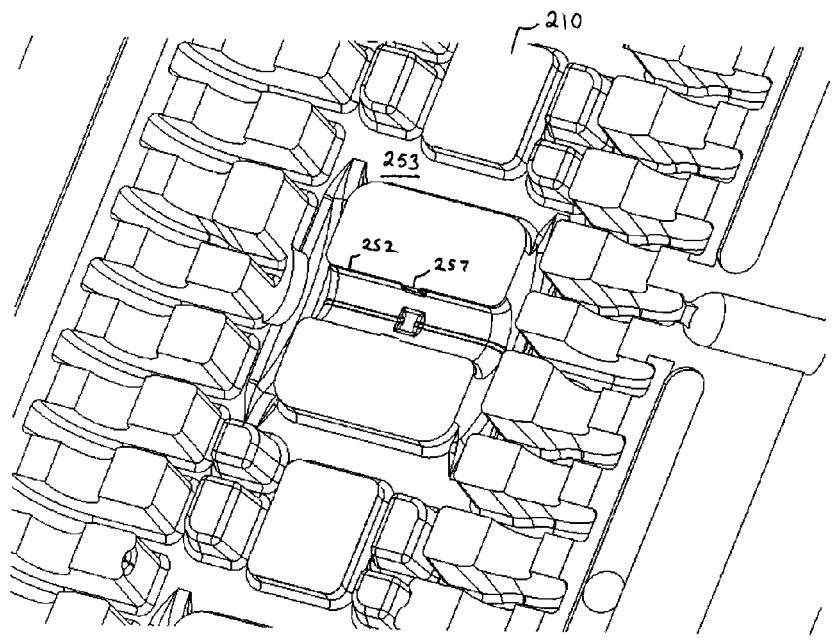
FIG. 10
FIG. 11
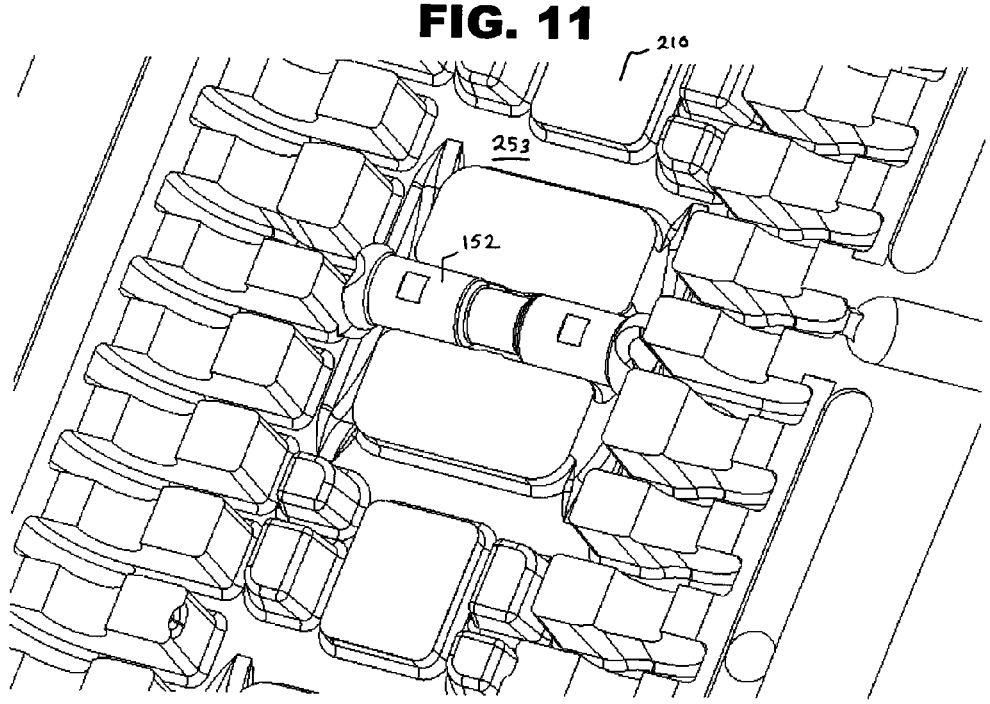

US 8,881,890 B2

CONVEYOR BELT MODULE WITH FIXED AXLES

RELATED APPLICATIONS

The present application is a continuation-in-part of U.S. patent application Ser. No. 13/113,538 entitled "Roller-Top Belt with Beam Stiffness", filed May 23, 2011, the contents of which are incorporated herein by reference. The present application relates to U.S. patent application Ser. No. 13/113,517 entitled "Multi-Piece Conveyor Belt Rollers" filed May 23, 2011, the contents of which are incorporated herein by reference.

BACKGROUND

The invention relates generally to power-driven conveyors and more particularly to modular plastic conveyor belts with article-supporting rollers.

Article-supporting rollers are used in modular plastic conveyor belts to provide low-friction rolling support to conveyed articles. In many roller-top belts, the rollers are mounted on steel axles in cavities formed in the belt modules used to construct the modular belt. Because of the presence of the cavities, the plastic modules are less stiff than they would be without the cavities. Wide roller-top belts with many cavities require more underlying support area, e.g., more wearstrips, across the width of the conveyor. More wearstrips can mean higher costs in materials and construction, more friction between the belt and the wearstrips, and increased obstruction to air flow through the belt. Thus, there is a need to minimize the support surface area required to support roller-top belts across their widths.

Roller-top belt modules with steel axles are more difficult to manufacture than standard modules without rollers. One way to manufacture a roller-top module is to injection-mold the module around a roller on a steel axle. The ends of the axle extend into the mold and are encapsulated in the molded module body. Another way is to injection-mold a module body with a receptacle for a roller. Then, in a secondary manufacturing step, a roller and axle are placed in each receptacle, and a cover is welded or otherwise retained in place over the ends of the axle to hold the roller in the module. Thus, there is a need to simplify the manufacture of roller-top belts.

SUMMARY

These needs and others are addressed by a conveyor belt module embodying features of the invention and a conveyor belt constructed of a series of rows of one or more of the modules linked together at hinge joints formed by interleaved hinge elements between adjacent belt rows. An intermediate portion of the conveyor belt module has a first end and an opposite second end that define the length of the intermediate portion, a top side and an opposite bottom side that define the thickness, and a first edge and an opposite second edge that define the width. Hinge elements of a first set are spaced apart across first gaps along the first end of the intermediate portion. Hinge elements of a second set are spaced apart across second gaps along the second end. At least one cavity bounded by one or more walls opens onto the top side and-or bottom side of the intermediate portion. An axle extending into the cavity is fixed to the intermediate portion via unitary molding or by molding the intermediate portion around an end of the axle, thereby embedding the axle end in the intermediate portion. A roller has a bore receiving the axle, on which the roller rotates.

According to one aspect of the invention, a method of manufacturing a conveyor belt module is provided. The method comprises the steps of molding an axle using a first injection mold, removing the first injection mold from the axle and molding an intermediate portion around the axle using a second injection mold such that at least one end of the axle is embedded in the intermediate portion. The intermediate portion comprises at least one hinge element on a first end and at least one hinge element on an opposite second end.

According to another aspect of the invention, a conveyor belt module comprises an intermediate portion and a molded axle having a first end embedded in the intermediate portion. The intermediate portion has a first end and an opposite second end defining the length of the intermediate portion, a top side and an opposite bottom side defining the thickness of the intermediate portion, a first edge and an opposite second edge defining the width of the intermediate portion, at least one hinge element on the first end and at least one hinge element on the second end.

According to another aspect of the invention, a molded axle for forming a conveyor belt module is provided. The molded axle comprises an elongated circular central portion, a pair of rounded lobes integrally formed on a first end of the central portion and a peripheral groove formed on the central portion for aligning the molded axle in an injection mold. A groove separates the rounded lobes.

BRIEF DESCRIPTION OF THE DRAWINGS

These aspects and features of the invention, as well as its advantages, are described in more detail in the following description, appended claims, and accompanying drawings, in which:

FIG. 5 is an isometric view of a mold for a conveyor belt module as in FIG. 3;

FIGS. 7A and 7B are top cross sectional views of the module of FIG. 6;

FIG. 8 is a cross sectional top view of a portion of the module of FIG. 5 taken along lines 8-8;

FIG. 10 illustrates a mold suitable for forming an intermediate portion of a module;

FIG. 11 illustrates the mold of FIG. 10 including an axle inserted therein;

FIGS. 18A-18C are axonometric views of a first roller piece, a second roller piece, and another complete roller usable in a conveyor belt module as in FIGS. 3 and 6;

FIGS. 19A and 19B are axonometric views of a roller piece and another complete roller usable in a conveyor belt module as in FIGS. 3 and 6;

DETAILED DESCRIPTION

Figure 1:
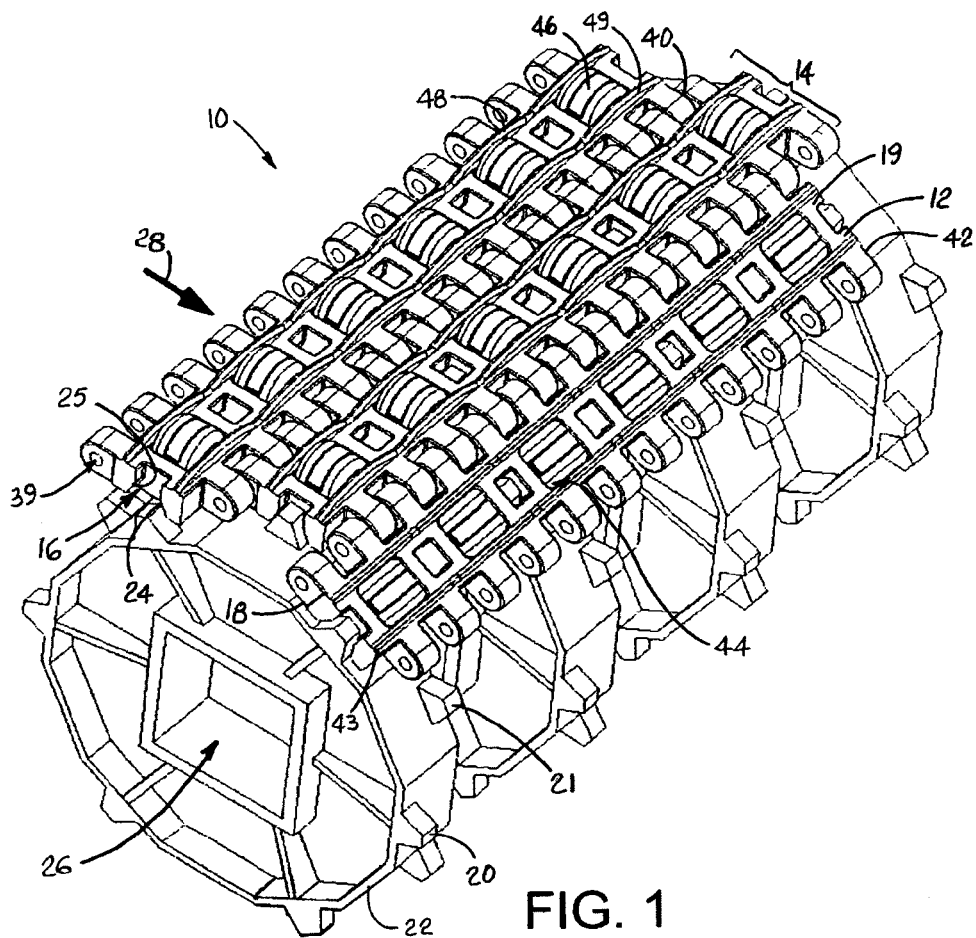
FIG. 1 is an isometric view of a portion of a modular plastic conveyor belt embodying features of the invention.

A portion of a conveyor belt embodying features of the invention is shown in FIG. 1. The portion of the modular conveyor belt 10 shown is an interior portion. Three conveyor belt modules 12 are connected together in three belt rows 14. The modules are shown offset laterally from row to row in a bricklay pattern. Although only one module 12 is shown in each row 14, other similar modules are connected side by side in each row to form an endless conveyor belt. Drive pockets 16 opening onto bottom sides 18 of the modules admit teeth 20 of drive or idle sprockets 22. The teeth 20 of drive sprockets drive against leading drive surfaces 24 bounding the pockets. The teeth 20 of idle sprockets are driven by trailing drive surfaces 25 bounding the pockets opposite the leading drive surfaces. The endless belt is trained around idle and drive sprocket sets, which are mounted on shafts (not shown) received in bores 26 of the sprockets. The shafts of the drive sprockets are rotated by a motor and gear box (not shown) to drive the belt in a direction of travel 28.

Figure 2:
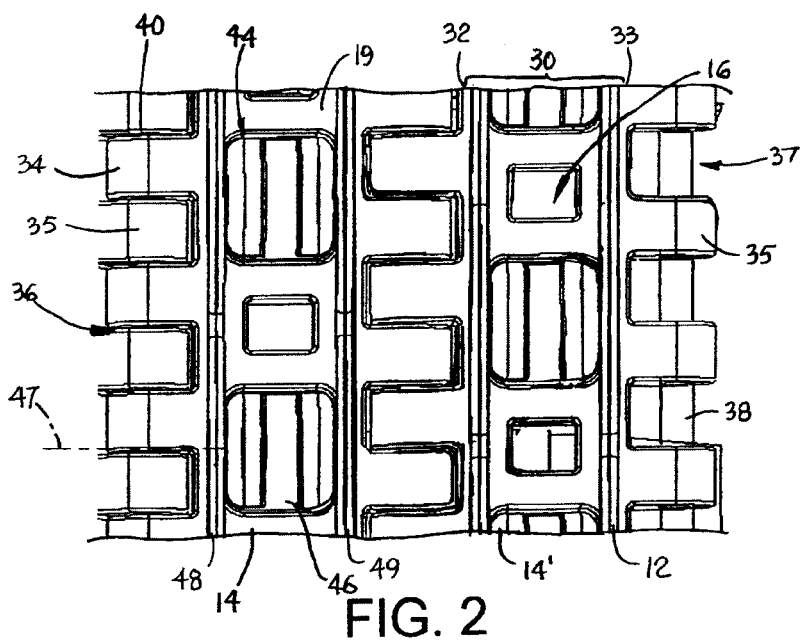
FIG. 2 is a top plan view of a portion of the conveyor belt of FIG. 1.

As shown in FIG. 2, each module 12 has an intermediate portion 30 that extends from a first end 32 to an opposite second end 33 defining the length of the module. The module extends in width from a first side edge 42 to an opposite second side edge 43. The thickness of the module is measured from the bottom side 18 to an opposite top side 19. Hinge elements of a first set 34 are spaced apart laterally along the first end 32, and hinge elements of a second set 35 are spaced apart laterally along the second end 33. First and second gaps 36, 37 between the hinge elements of the first and second sets 34, 35 are sized to allow the first set of hinge elements of one row to interleave with the second set of hinge elements of an adjacent row. Hinge pins 38 through aligned openings 39 in the interleaved hinge elements connect adjacent rows together at hinge joints 40 in the endless belt 10.

Each belt module 12 has one or more cavities 44 that open onto the top side 19 of the module. The illustrative cavities 44 are formed in the middle of the intermediate portion 30 of the module 12. Alternatively, a cavity 44 may comprise an opening or concave portion formed in a side edge or other location on the intermediate portion, which forms a portion of a bounded cavity when two modules are placed side by side. The cavities 44 may alternatively or also open onto the bottom side 18 of the module. A belt roller 46 is mounted in each cavity for rotation on an axis 47. The illustrative axis 47 is parallel to the length of the intermediate portion, though the invention is not limited to the axis 47 being parallel. The axis 47 of the roller may be skewed, perpendicular, or otherwise oriented relative to the length of the intermediate portion. The rollers 46 on one row 14 are shown offset in the width direction from those in an adjacent row 14' for more even article support. Salient portions of the rollers 46 may extend above the top side 19 of the belt into a supporting position for conveyed articles.

First and second parallel ridges 48, 49 extend laterally across the width of the module along the first and second ends 32, 33. The ridges increase the module's beam stiffness. The ridges shown are wavy, their height above the top side varying across the width of the module. The height of the ridges is at a maximum at the position of the roller cavities 44. But the peak of the ridges is below the tops of the rollers. The height of the ridges decreases to a minimum midway between cavity positions in the module. In this way, the bottoms of conveyed articles are guaranteed to ride atop the rollers, and trip points on the ridges are minimized.

Figure 3:
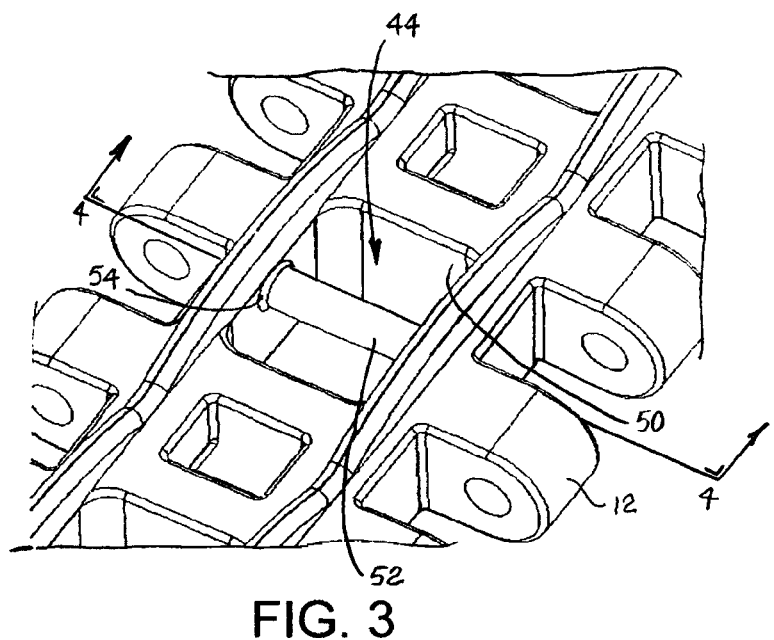
FIG. 3 is an enlarged isometric view of the top surface of a module of a conveyor belt as in FIG. 1.

A portion of the belt module 12 without a roller is shown in FIG. 3. The roller cavity 44 in the intermediate portion 30 is bounded by a perimetric wall 50, though alternatively, the roller cavity 44 may be formed in a side edge or other location of the intermediate portion 50. An axle 52 for the rollers extends across the cavity. In the illustrative embodiment, the axle 52 extends diametrically across the cavity, with the ends 54 of the axle terminating at opposite positions on the wall, though the axle 52 may alternatively extend across only a portion of the cavity 44.

Figure 4:
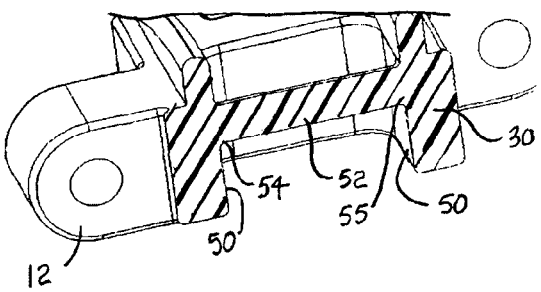
FIG. 4 is an axonometric cross section of the module of FIG. 3 taken along lines 4-4.

Preferably, the axle 52 is fixed relative to the intermediate portion 30. According to one embodiment of the invention, shown in cross section in FIG. 4, the axle 52 is formed unitarily with the intermediate portion 30 of the module 12, its ends 54, 55 continuous with the wall 50 and the rest of the module. In this example, the axle's axis (47, FIG. 2) is parallel to the length of the intermediate portion 30 so that the roller rotates transverse to the direction of travel. But the axle 52 could be formed in the cavity at other angles, such as with its axis of rotation parallel to the width of the direction of the intermediate portion for the roller to rotate in or opposite to the direction of travel.

One way of manufacturing the module with the integral axle 52 is shown in FIG. 5. A molten thermoplastic polymer, such as polypropylene, polyethylene, acetyl, or a composite polymer, is injected into a cavity region 56 of a closed mold consisting of two mold halves 58, 59 (shown separated). (The axle and cavity portion 60 of one half of the mold is shown in FIG. 5.) Once the mold cavity is filled, heat and pressure are applied to the joined mold halves to mold the module. The mold halves are parted and the molded module ejected. In this way, the axle is molded unitarily with the intermediate portion of the module.

Figure 6:
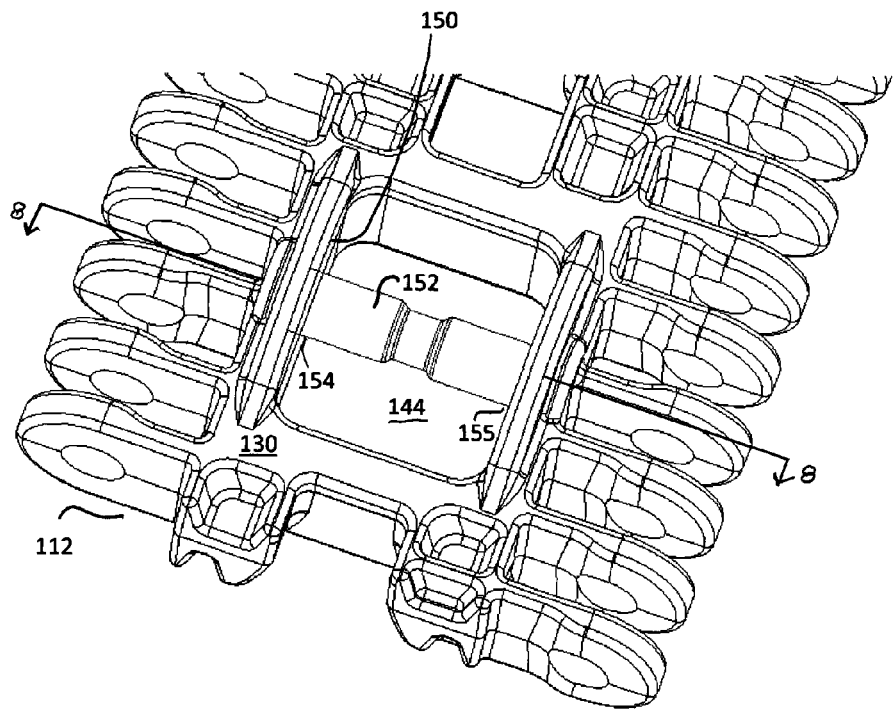
FIG. 6 is an enlarged isometric view of a conveyor belt module having an embedded axle formed by molding the intermediate portion around the axle according to one embodiment of the invention.
Figure 7A:
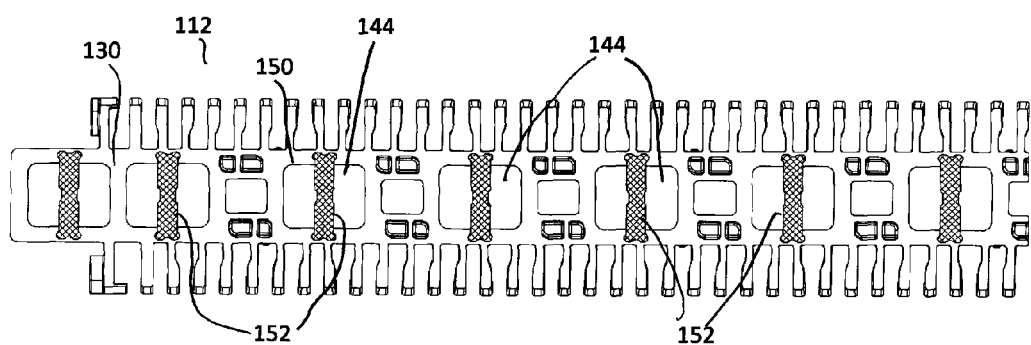

According to another embodiment of the invention, an axle for receiving a roller may be formed separately from an intermediate portion of the module. FIGS. 6-8 illustrates an embodiment of a conveyor belt module 112 having an embedded axle 152 formed by molding the intermediate portion 130 around the axle 152. While the embodiments of FIGS. 6-8 show an axle having both ends 154, 155 embedded in an intermediate portion 130, one skilled in the art will recognize that the invention includes axles 152 having only one end embedded in the intermediate portion. The module 112 may be formed by first molding or otherwise forming one or more axles 152, then molding the intermediate portion around at least one end 154, 155 of the axle 152. In the embodiment shown in FIG. 7A, the module 112 includes a plurality of axles 152 embedded in the intermediate portion 130. Each illustrative axle 152 extends from a wall 150 of the intermediate portion 130 into a cavity 144, though axles may be placed in any suitable location relative to the intermediate portion.

In one embodiment, the module 112 may be formed of two or more different materials. For example the structural part of the module, the intermediate portion 130, may be molded of a first material, which is preferably a thermoplastic polymer, such as polypropylene, polyethylene, acetyl, polyetheretherketone (PEEK), polyphenylenesulfide (PPS), nylon or a composite polymer. The axle 152 may be molded or otherwise formed of a second, different material, such as a nylon material, polyetheretherketone (PEEK), polyphenylenesulfide (PPS), or another polymer. In this manner, each component may be optimized for a particular function, while ensuring that the axle 152 is fixed relative to the intermediate portion 130. For example, a nylon axle may have properties better suited for mounting the roller, such as impact resistance, wear resistance, low friction, strength and so on, and the intermediate portion may have properties better suited for conveying objects. For example, forming the intermediate portion of the belt, which uses the largest amount of material, out of polypropylene, which is less expensive than nylon, reduces costs while ensuring preferred properties in the axle region. In another embodiment, a conveyor belt module may comprise a polypropylene intermediate portion molded around a polyetheretherketone axle, which is suitable for acid resistance. In another embodiment, a flame resistant conveyor belt module may comprise a nylon intermediate portion molded around a polyphenylenesulfide axle. One skilled in the art will recognize that any suitable combination of materials may be used, depending on the particular application for the conveyor belt module.

Figure 9A:
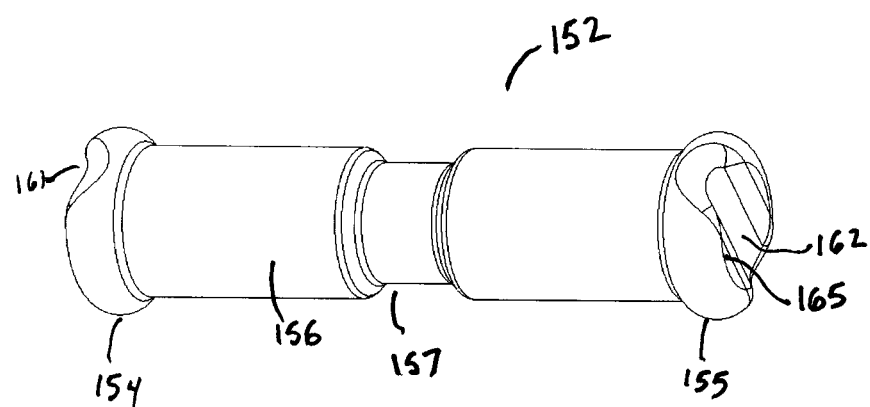
FIGS. 9A-9B illustrate a molded axle according to one embodiment of the invention.
Figure 9B:
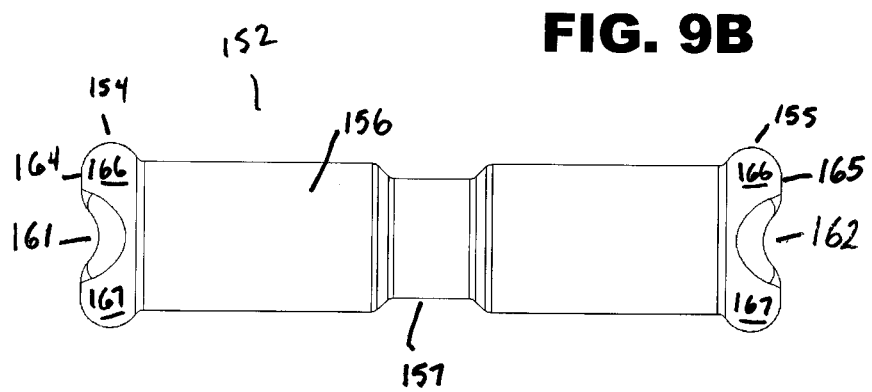
Figure 12A:
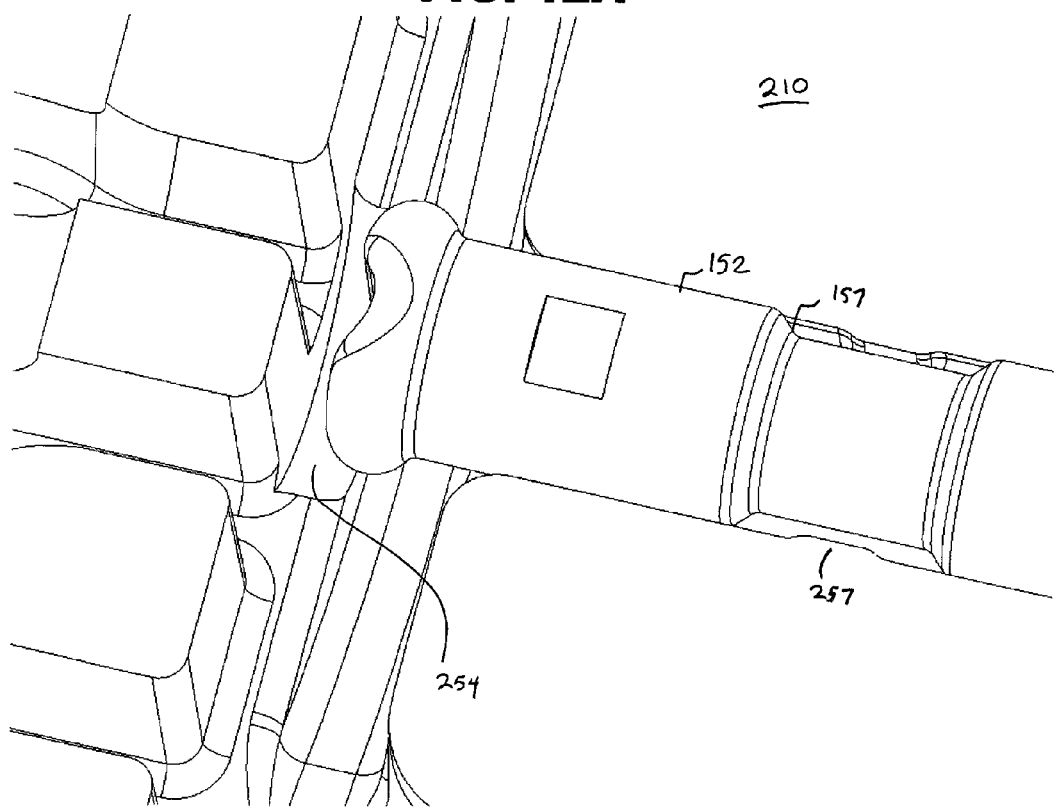
FIGS. 12A-12C are close-up views of the axle inserted in the mold of FIG. 10.
Figure 12B:
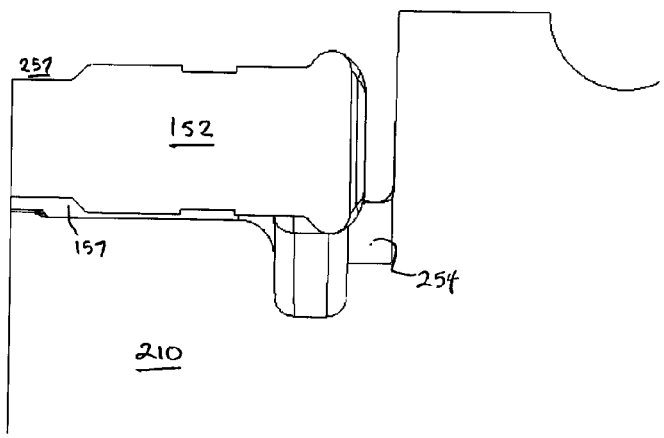
Figure 12C:
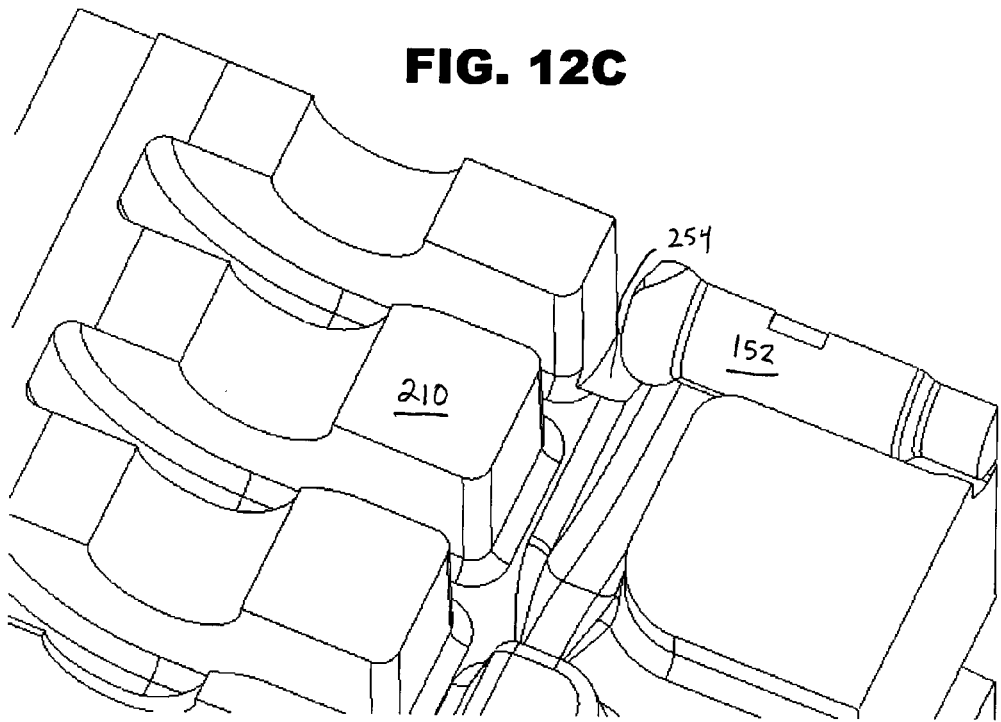

FIGS. 9A and 9B illustrate the axle 152 according to one embodiment of the invention. The illustrative axle 152 may be configured to facilitate embedding of the axle in an intermediate portion of a conveyor belt module. The axle 152 includes an elongated circular central portion 156 including an alignment guide, illustrated as a groove 157 formed in the middle of the central portion 156. The groove 157 may be continuous about the periphery of the central portion 156 or comprise one or more smaller grooves. The alignment guide helps align the axle 152 in the end-to-end direction as it is placed in a module injection mold 210, shown in FIG. 11, to ensure proper alignment of the axle 152 relative to the intermediate portion 130. The alignment guide may alternatively comprise a projection or other suitable feature for aligning the axle in an injection mold.

One or both of the axle ends 154, 155 may include an anti-rotation feature to prevent the axle 152 from rotating relative to the intermediate portion 130 after formation of the intermediate portion around the axle. For example, in the embodiment of FIGS. 9A and 9B, each end 154, 155 includes a groove 161, 162 extending across each end face 164, 165 of the axle 152. During formation of the intermediate portion around the axle 152, intermediate portion material fills the grooves 161, 162 preventing rotation of the axle relative to the intermediate portion 130 once solidified. The illustrative grooves 161, 162 are chamfered at each end, though the invention is not limited to chamfered grooves, nor must the grooves be parallel as shown in the illustrative embodiment. The anti-rotation feature on the axle ends 154, 155 may have any suitable configuration. For example, the anti-rotation feature may comprise one or more protrusions or recesses formed in the axle ends 154, 155. Alternatively, an axle end 154, 155 may have a polygonal cross-section to prevention rotation of the axle relative to the intermediate portion after solidification of the thermoplastic material.

According to the illustrative embodiment, one or both axle ends 154, 155 may be enlarged relative to the central portion 156 of the axle to form a tensile feature, facilitating load transfer between the intermediate portion 130 and the axle 152. The enlarged ends further anchor the axle 152 to the intermediate portion 130. The tensile feature allows the axle 152 to be loaded in the axial direction, creating a mechanical connection between the intermediate portion 130 and the axle 152. The anti-rotation grooves 161, 162 bisect the enlarged end faces 164, 165 to form rounded lobes 166, 167 that facilitate load transfer in the axial direction between the intermediate portion and the axle.

The module 112 having an embedded axle may be formed using a multi-step injection-molding process, comprising a first step of forming the axle 152 and a second step of molding the intermediate portion 130 around the axle. For example, the axle 152 may first be formed by an injection-molding process using a first injection mold or another suitable formation means, such as extrusion or cutting an off-the shelf rod to size. In one embodiment, the method of forming the axle 152 comprises injecting a molten material, such as nylon or another suitable material, into a cavity region of a closed injection mold consisting of two mold halves each defining a portion of the axle 152. Once the mold cavity is filled, heat and pressure are applied to the joined mold halves to mold the axle. The mold halves are parted and the molded axle 152 ejected.

After formation of the axle, the intermediate portion 130 may be injection-molded around the axle 152 using a mold comprising two injection mold halves 212, one of which is shown in FIG. 10, to encapsulate one or both axle ends and fix the axle 152 to the intermediate portion 130. As shown in FIGS. 11 and 12A-12C, one or more axles 152 are placed in axle-receiving recesses 252 in a mold cavity 253 in one half of a module injection mold 212. The axle-receiving recesses 252 each include an axle aligner, illustrated as an annular projection 257, which cooperates with the groove 157 on the axle 152 to prevent axial movement of the axle 152 relative to the mold 212.

After placing the axle(s) 152 in a first half of the injection mold 212, a second module mold half closes and seals the injection mold. Then, a thermoplastic material, such as, but not limited to, polypropylene, polyethylene, acetyl, polyetheretherketone (PEEK), polyphenylenesulfide (PPS), nylon or a composite polymer, is injected into the module mold 212 filling the entire mold cavity 253, except for the portion occupied by the axle 152. Once the mold cavity 253 is filled, heat and pressure may be applied to the joined mold halves to mold the intermediate portion around the axle. The mold halves are parted, and the molded module ejected. The resulting module 112 includes one or more of the axle ends 154, 155 embedded in the intermediate portion 130.

Figure 13A:
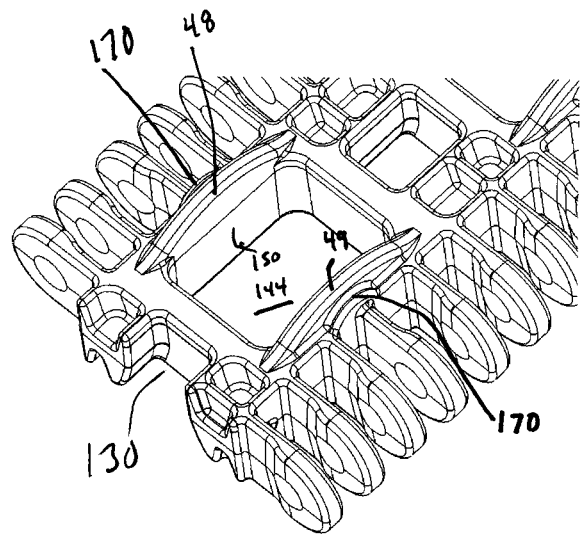
FIGS. 13A-13B illustrate an intermediate portion of a module according to an illustrative embodiment of the invention.
Figure 13B:
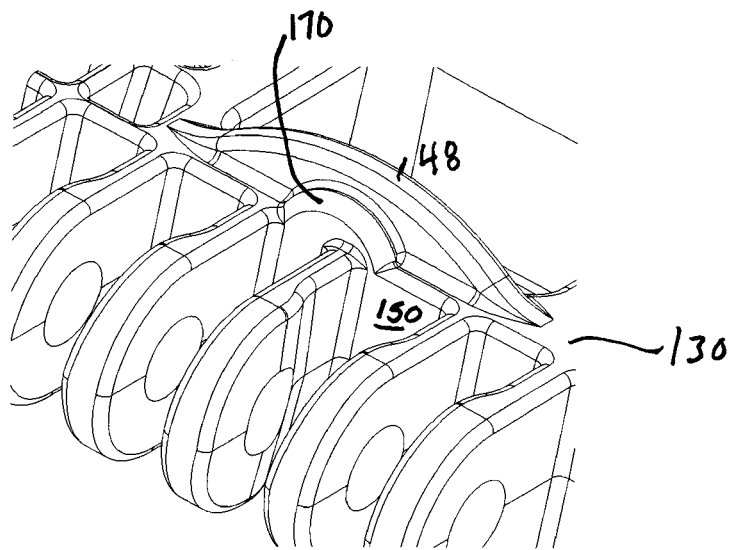

Referring to FIGS. 13A-13B, the intermediate portion 130 may also include an axle fender 170, illustrated as a bump adjacent to the ridges 48, 49. The axle fender 170 is formed by a recess 254 in the mold cavity 253, shown in FIGS. 12A-12C, which essentially thickens the ridge 48, 49 and wall 150 of the intermediate portion 130 in which the axle ends are embedded and ensures a clearance between the end of the axle and the mold surface during formation of the module.

One skilled in the art will recognize that the intermediate portion is not limited to the illustrative embodiment, and that the intermediate portion the conveyor belt module may have any suitable size, shape, or configuration. For example, the intermediate portion may comprise separate hinge members, and an axle 152 may be embedded in the hinge members through the process described above to form a cradle for a conveyor belt using an injection-molding process.

The multi-step formation process used to form a conveyor belt module according to one embodiment of the invention has significant advantages. For example, the use of two separate molding processes for the axle and the intermediate portion enables the use of different materials in different sections of the conveyor, while ensuring fixation of the axle to the intermediate portion, thereby facilitating operation and assembly of the conveyor belt module. The multi-step formation process may also reduce tooling costs and simplify mold fabrication.

Figure 14:
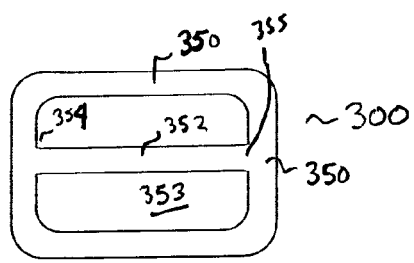
FIG. 14 illustrates a cartridge having a fixed axle suitable for insertion into an intermediate portion of a conveyor belt module according to one embodiment of the invention.

According to another embodiment, an axle for mounting a roller may be integrally formed with or molded into a cartridge designed to drop into an intermediate portion of a conveyor belt. For example, as shown in FIG. 14, a cartridge 300 may be formed with side walls 350 defining a cavity 353. An axle 352 extends from at least one of the side walls 350 into the cavity 353. The side walls 350 may be molded around one or both of the axle ends 354, 355 or integrally formed therewith. The intermediate portion of an associated conveyor belt module may include an opening configured to receive the cartridge 300. For example, the intermediate portion may have an opening with a shelf having an inner diameter that is smaller than the outer diameter of the cartridge 300. The cartridge may be inserted into the intermediate portion and fixed to the intermediate portion through adhesive-bonding, sonic welding or another suitable conventional mechanical and chemical fastening technique. Alternatively, the intermediate portion may be overmolded with the cartridge 300. In another embodiment, a two-material, two-shot molding technique may be used, wherein the module and axle are molded in the same mold out of different materials.

Figure 15:
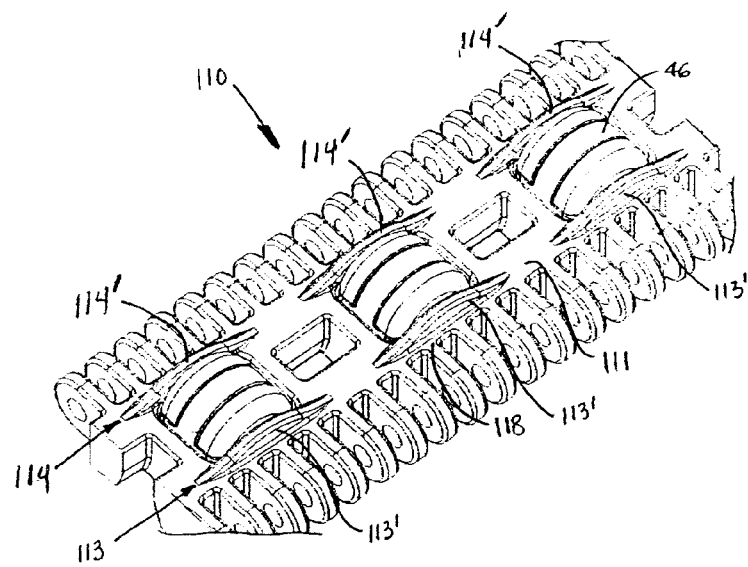
FIG. 15 is an isometric view from the top side of a portion of another version of conveyor belt module usable to make a conveyor belt as in FIG. 1.
Figure 16:
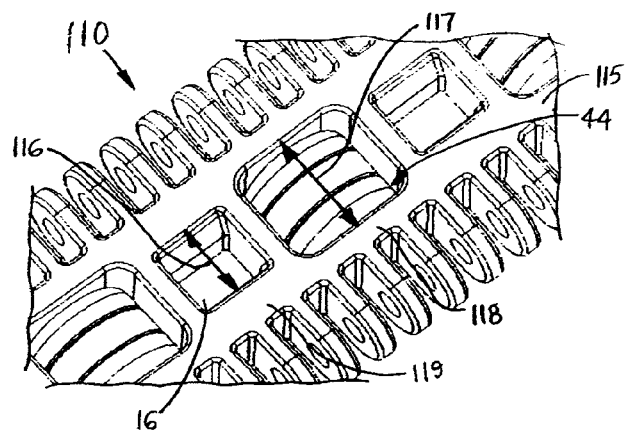
FIG. 16 is an isometric view of a portion of the bottom side of the conveyor belt module of FIG. 10.

Another version of a conveyor belt module that can be used to construct stiff roller-top belts is shown in FIGS. 15 and 16 from the top and bottom sides. The conveyor belt module 110, which is similar to the belt module 12 of FIG. 3, has on its top side 111 first and second ridges 113, 114 that are segmented across the width of the intermediate portion of the module into individual ridge segments 113', 114' whose maximum heights coincide with the positions of the rollers 46. As seen from the bottom side 115 of the module in FIG. 16, the length dimension 116 of the drive pockets 16 is less than the length dimension 117 of the roller cavities 44, which means that the beam portions 118 between the hinge elements and the cavities are thinner than the beam portions 119 between the hinge elements and the drive pockets 16. The ridge segments 113', 114' on the top side of the thinner beam portions 118 add stiffness to those thinner portions.

Figure 17A:
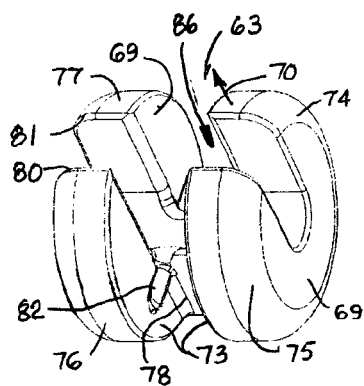
FIGS. 17A-17C are oblique views of a first roller piece, a second roller piece, and a complete roller usable in a conveyor belt module as in FIGS. 3 and 6.
Figure 17B:
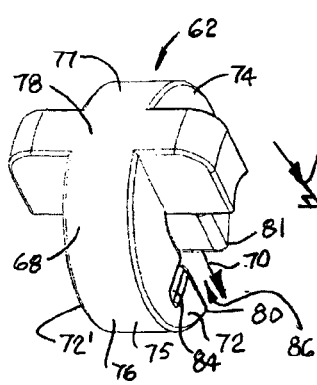
Figure 17C:
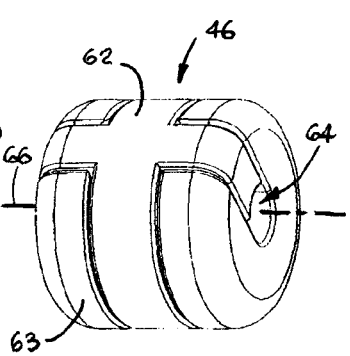

Because one or both ends 54, 55 of the axles are continuous with the walls 50 or irremovably embedded in the walls, the belt rollers 46 cannot be axially inserted onto the axles. A multi-piece roller or a one-piece snap-together roller may be used to insert a roller onto the axle. FIGS. 17A-17C show one version of a multi-piece roller 46. The roller consists of two different pieces: a first roller section 62 and a second roller section 63. The two sections are inserted radially or vertically onto the axle and joined together like three-dimensional puzzle pieces. When joined, the two roller sections form the complete roller 46 with a central bore 64 along a central axis 66 of the roller. The first roller section 62 has a first interdigitating member 68 that interdigitates with a pair of second interdigitating members 69 on the second roller section 63 to form the complete roller 46. The complete roller is assembled by sliding the two roller sections 62, 63 together in a radial direction 70 perpendicular to the central axis 66.

Each of the interdigitating members 68, 69 has a lateral face 72 in contact with a lateral face 73 of an adjacent interdigitated member. In this example, the outward facing lateral faces 72, 72' of the first roller section 62 contact the inward-facing lateral faces 73 of the second roller section 63. The axially overlapped faces prevent axial separation of the two interdigitated roller sections. Each of the interdigitating members 68, 69 has a pair of fingers 74, 75 on opposite sides of the bore 64. Each finger 74, 75 forms a portion 76, 77 of the outer periphery of the complete roller 46. The fingers extend from a cap member 78 out to distal ends 80, 81. Like the fingers, the cap members form a portion of the periphery of the complete roller. The interdigitated roller sections are retained together by locking means in the form of locking ears 82 formed on the lateral faces 73 of the second roller section 63 in cooperation with matching detents 84 formed in the lateral faces 72, 72' of the first roller section 62. The ears snap in place in the detents to lock the roller on the axle and prevent it from radially separating in operation. The first and second roller sections 62, 63 surround less than 360° of the bore and form a gap 86 opening into the bore that is wide enough to admit an axle radially into the bore. In this example, the interdigitating members surround about 180° of the bore.

Another version of a multi-piece belt roller is shown in FIGS. 18A-18C. The complete roller 46' is externally identical to the roller 46 of FIG. 17C. The only difference is the locking means in which locking ears 82' are formed on the cap members 78' of the first and second roller sections 62', 63' and mating detents 84' are formed in the fingers 74', 75'.

Yet another version of a multi-piece roller that is usable in a conveyor belt as in FIG. 1 is shown in FIGS. 19A and 19B. In this version, the complete roller 90 consists of two identical roller sections 92. Each roller section in this example has three interdigitating members: two internal members 94 and an end member 95. The interdigitating members are identical except that the end member 95 has a rounded outer face 96 that forms an end of the complete roller 90. Like the rollers of FIGS. 17 and 18, the roller 90 has a cap portion 98 that forms a portion of the outer periphery of the roller across its entire axial length. The interdigitating members 92, 93 extend from a flat base 100 of the cap member 98 to flat distal ends 102. When the complete roller is assembled as in FIG. 19B, the flat distal ends of the interdigitating members rest on the flat base of the cap member of the other roller section. Because the cap members are opposite each other, they help prevent impulse or shock loads from separating the roller sections. The interdigitating members 94, 95 of each roller section 92 in this roller surround more than 180° of the bore 64. Unlike the rollers of FIGS. 17 and 18, the roller 90 has gaps 104 leading into the bore 64 that, at their narrowest, are narrower than the bore's diameter 106. The restricted opening into the bore portion 108 allows each roller section to snap onto an axle whose diameter is slightly greater than the width of the gaps 104.

Other locking means for locking the two roller sections together include adhesive-bonding, sonic welding, and other conventional mechanical and chemical fastening techniques. Furthermore, each of the roller sections could be molded out of more than one material to provide desirable operating characteristics and a variety of outer periphery textures.

The snap-on roller may have any suitable configuration and number of components suitable for allowing the roller to be mounted on an axle fixed to an intermediate portion of a conveyor belt module.

Figure 20:
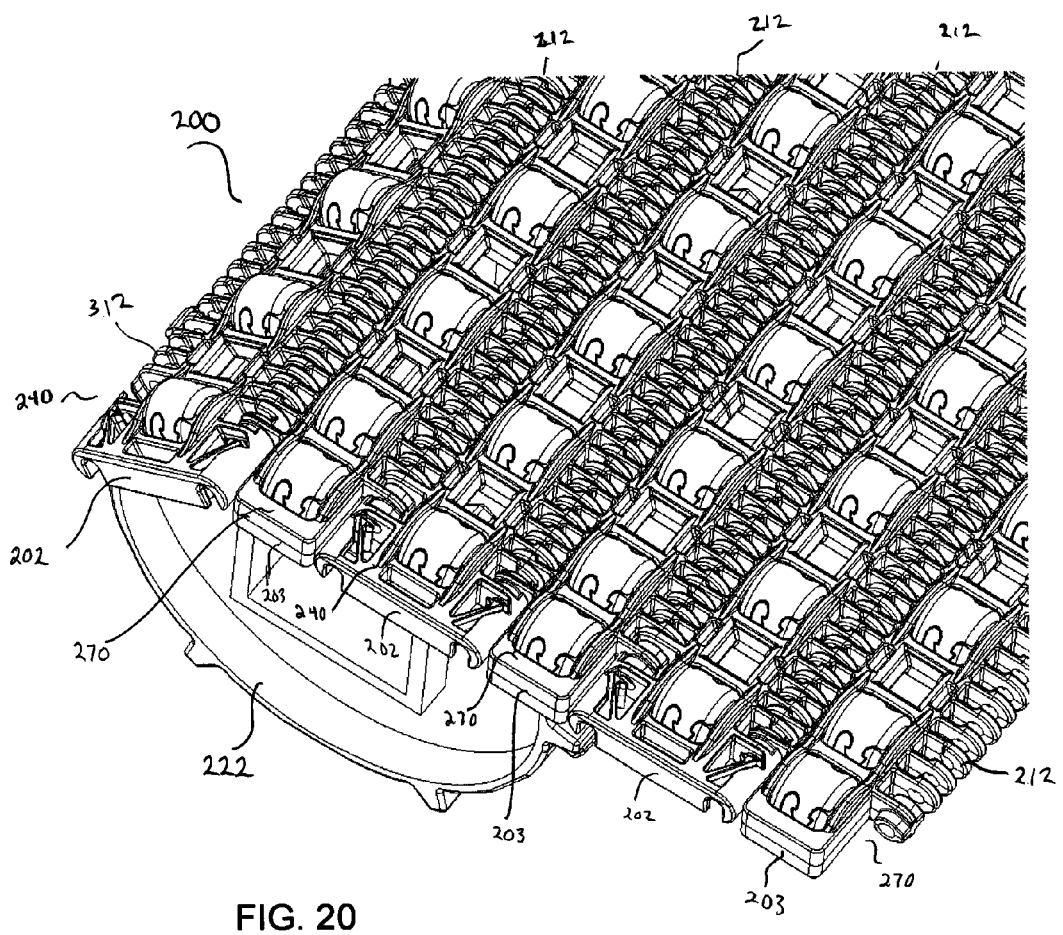
FIG. 20 is an isometric view of a portion of another embodiment of a modular plastic conveyor belt embodying features of the invention

FIG. 20 illustrates an edge portion of a conveyor belt 200 including fixed axles trained around a sprocket set 222, according to another embodiment of the invention. The conveyor belt 200 comprises alternating rows of "A" modules 240 and "B" modules 270 connected together. Each module includes hinge elements 212 on each end for allowing the "A" modules to interleave with the "B" modules. Hinge pins (not shown) extending through aligned openings in the interleaved hinge elements connect adjacent rows together at hinge joints 204 in the endless belt 200. The side edges 202 of the "A" row modules 240 align with the side edges 203 of the "B" row modules 270 align to create a flush edge of the conveyor belt 200. In one embodiment, the side edges 202 of the "A" row modules are larger than the side edges 203 of the "B" row modules, as described below. The modules further include an alignment guide, embodiments of which are described below, to facilitate assembly of the conveyor belt.

Figure 21:
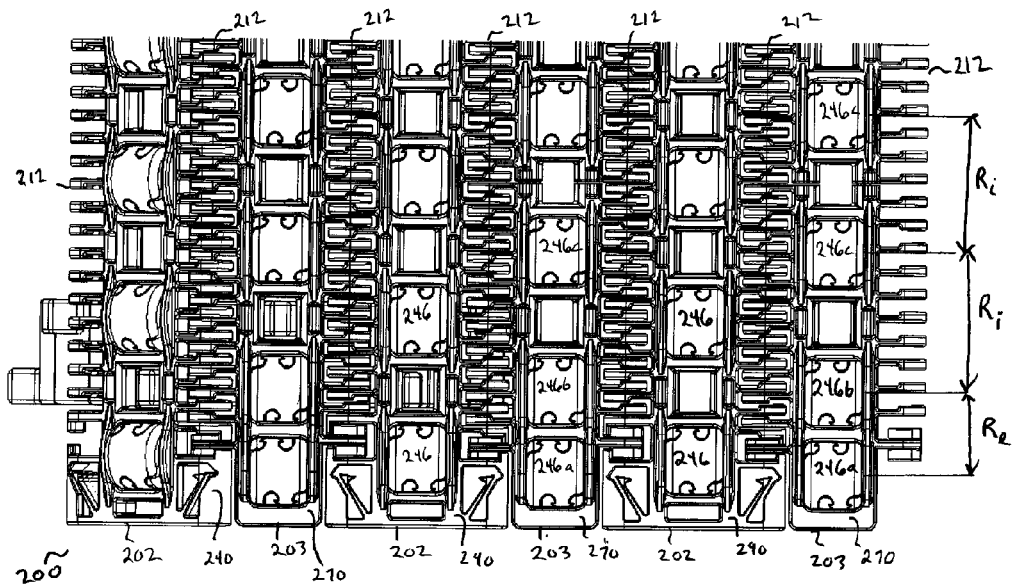
FIG. 21 is a top view of the conveyor belt of FIG. 20.
Figure 22:
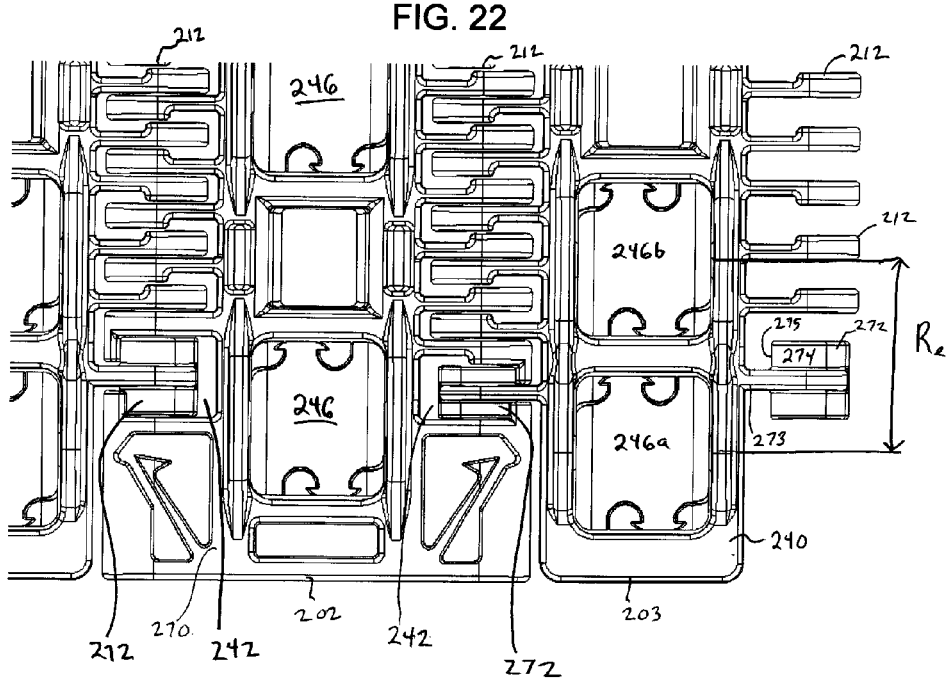
FIG. 22 is a close-up view of a portion of the conveyor belt of FIG. 21.

Referring to FIGS. 21 and 22, the rollers 247 in the conveyor belt 200, which may be mounted on fixed molded axles as previously described, are generally offset from each other from row to row. The "B" modules rollers 246 may be irregularly spaced across the width of the module. While the rollers 246 of the "A" module 240 are uniformly spaced across the module length, the separation distance between consecutive rollers in the "B" module 270 varies. In the illustrative embodiment, the "B" modules 270 include two adjacent rollers 246a, 246b at the side edge 203 to facilitate introduction of a tire or other item to be conveyed onto the conveyor belt. As shown, the rollers 246c in the more interior portion of the module 270 are separated by a larger separation distance R than the distance $R_e$ separating the two edge rollers 246a, 246b of the "B" modules. In this manner, while the interior portion of the belt 200 includes alternating rows of offset, equally spaced apart rollers 246, the edge portion of the belt, at least in the "B" rows, includes rollers that are closer together. Each "A" and "B" row therefore has a roller 246 mounted on an axle in the proximity of the edge 202 or 203.

Figure 23:
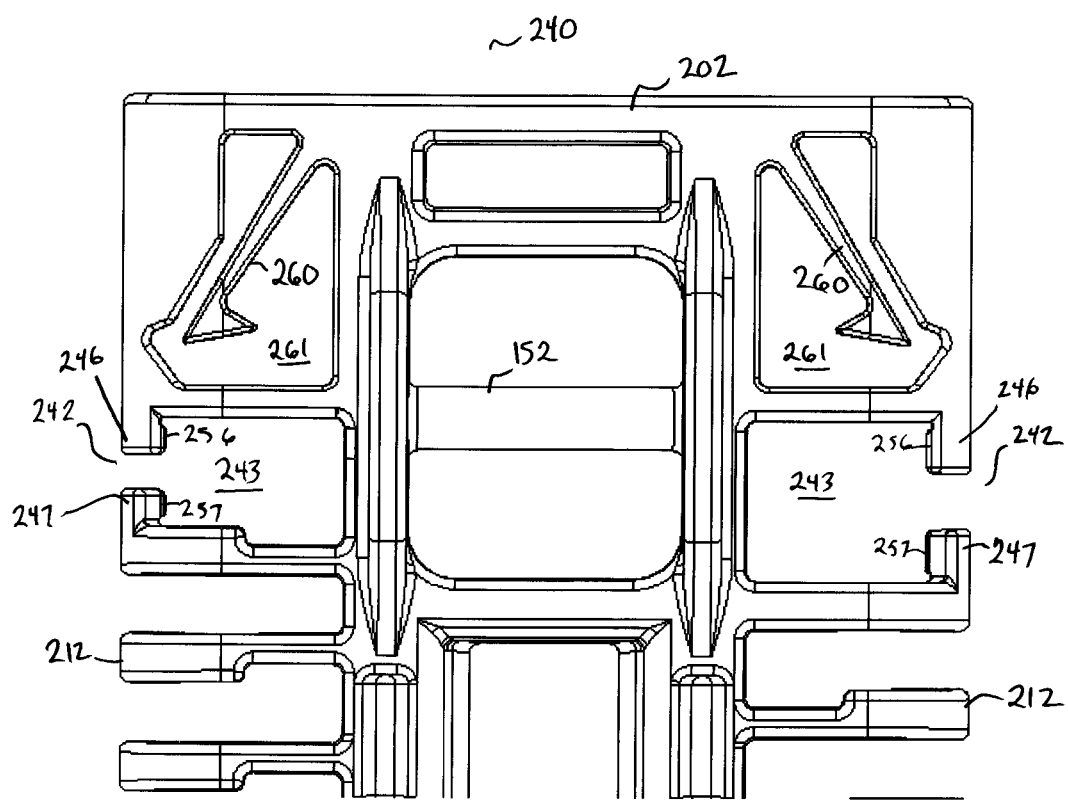
FIG. 23 is a top view of an "A" row conveyor belt module in the modular plastic conveyor belt of FIG. 20.
Figure 24A:
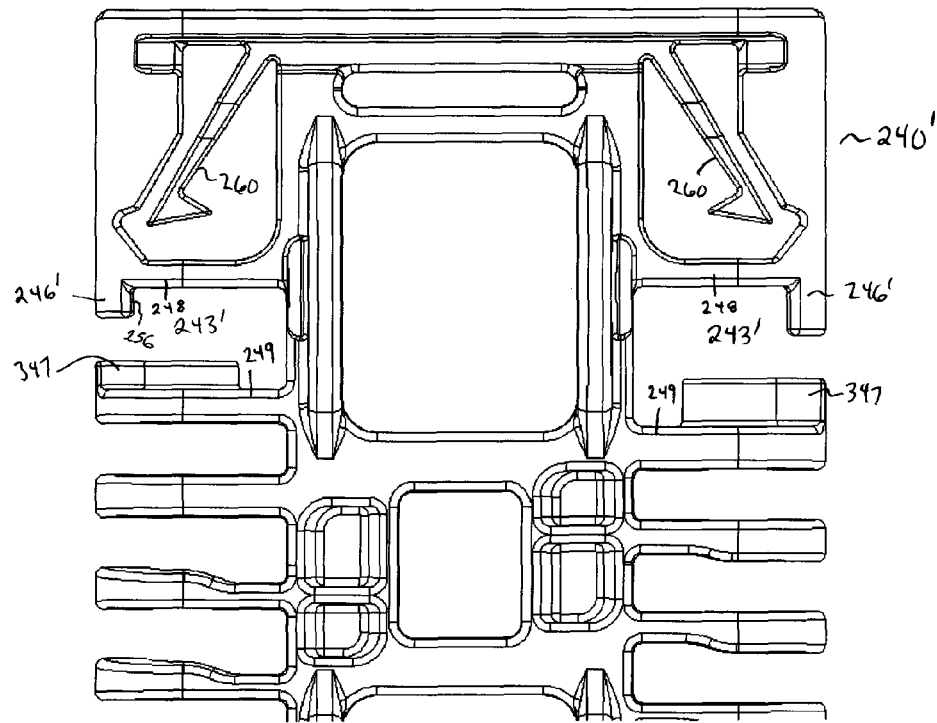
FIG. 24A-C illustrate an "A" row conveyor belt module according to another embodiment of the invention.
Figure 24B:
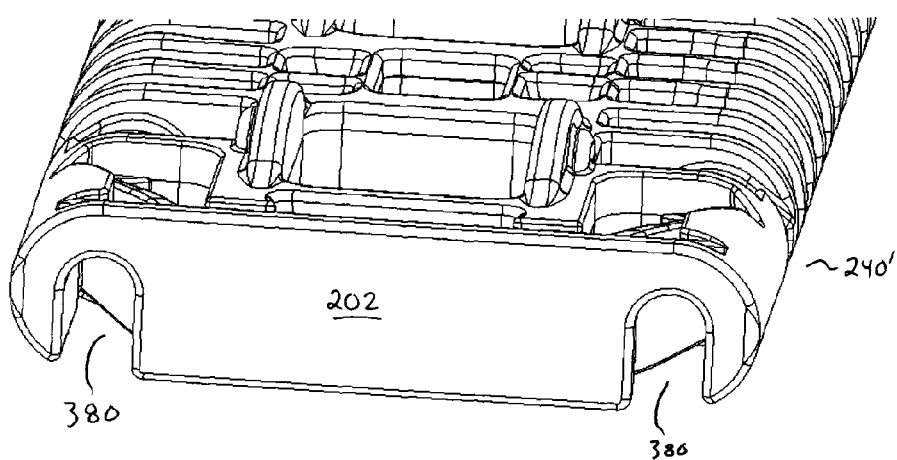
Figure 24C:
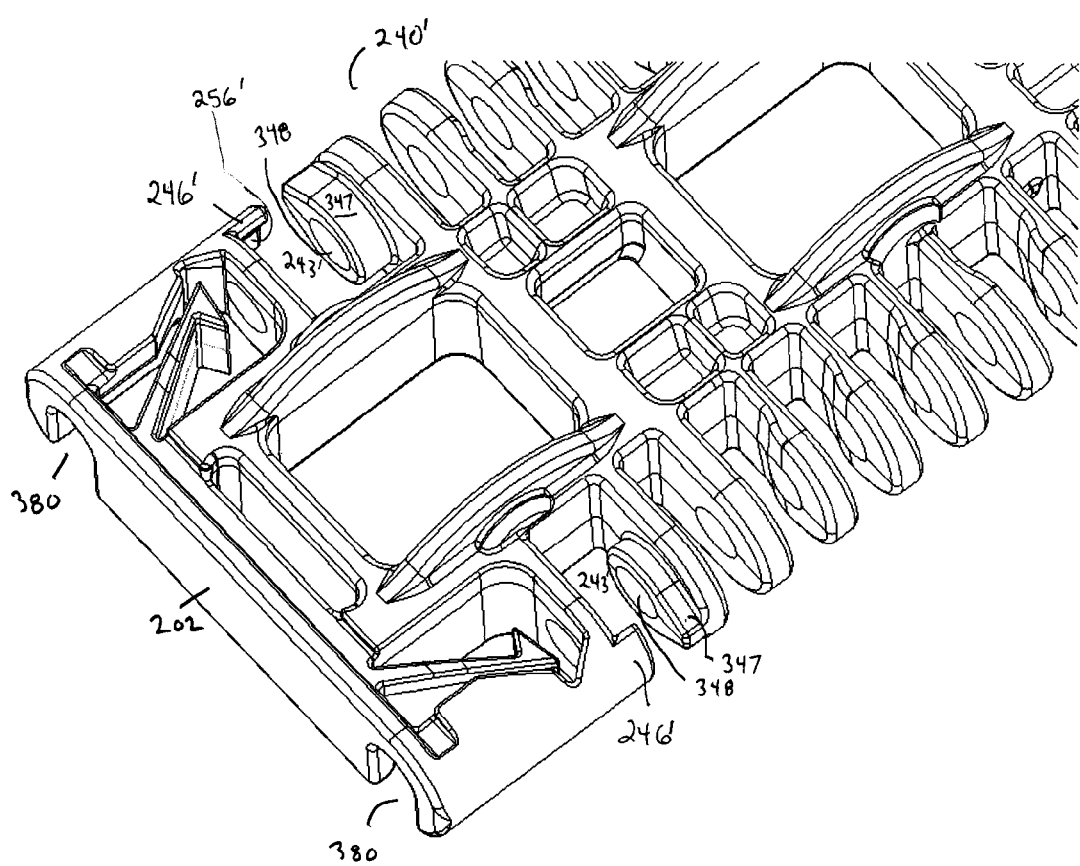
Figure 25A:
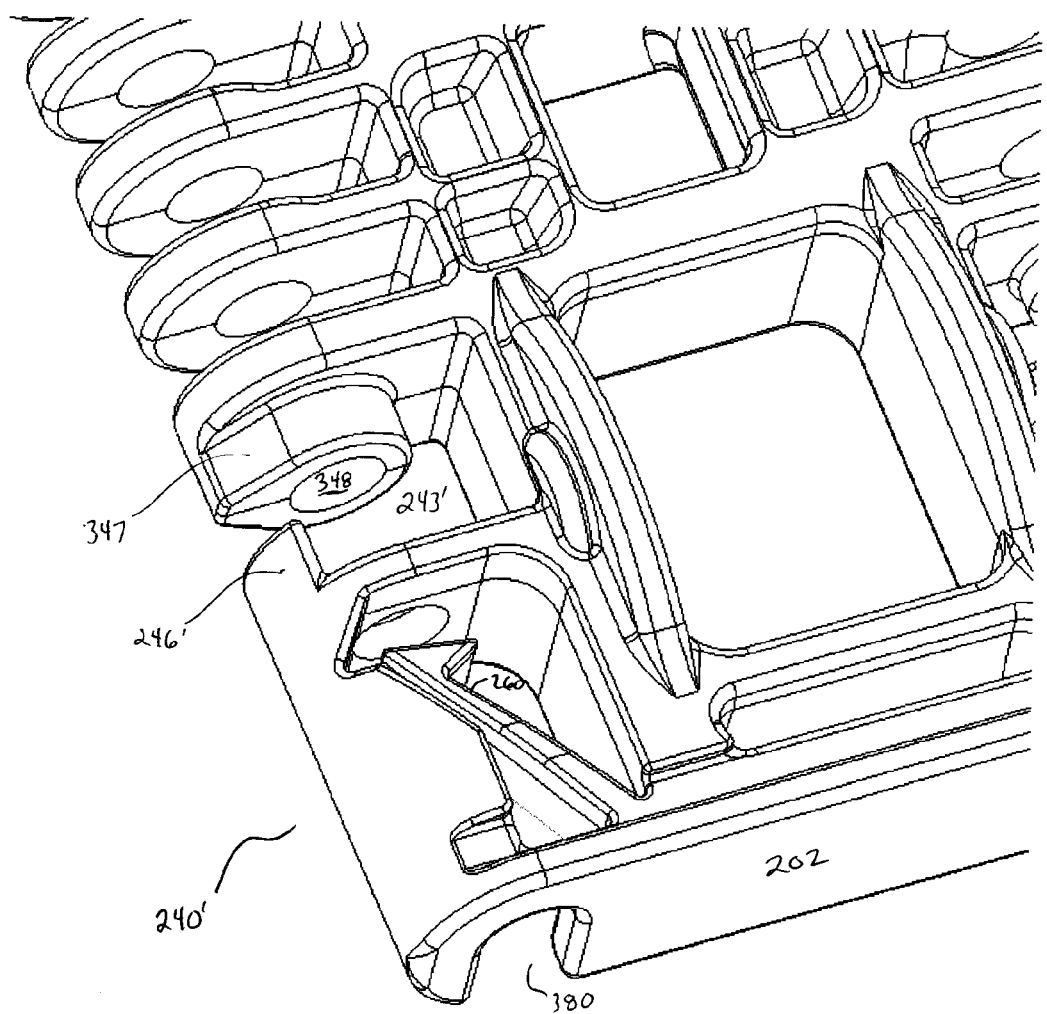
FIGS. 25A and 25B are detailed views of a portion of the "A" row conveyor belt module of FIGS. 24A-C.
Figure 25B:
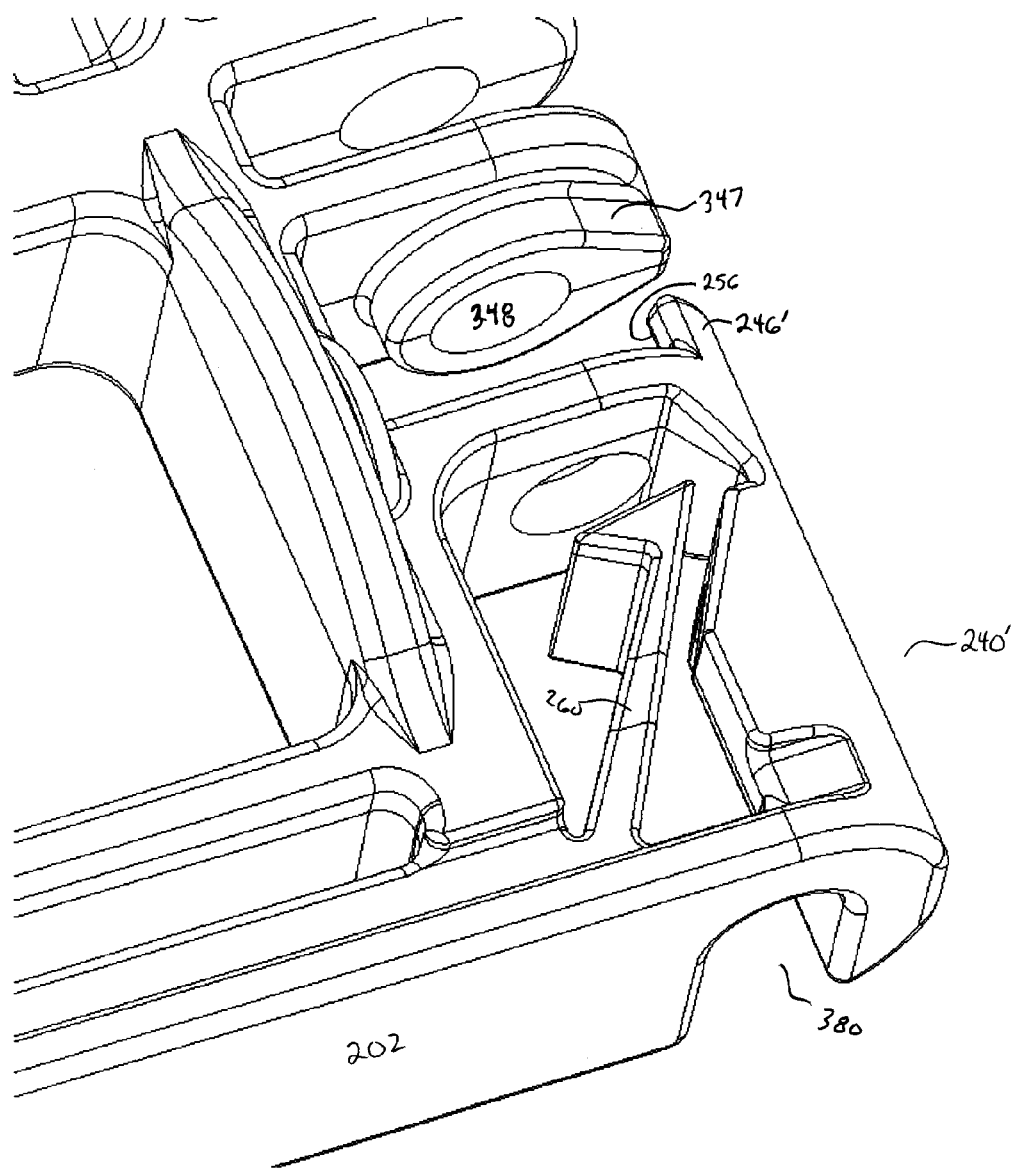

The conveyor belt 200 further includes an alignment guide to facilitate assembly of the belt. The alignment guide hooks the edge portions of adjacent modules 240, 270 together near the outside edge to prevent them from separating. In the embodiment of FIGS. 22 and 23, the alignment guide includes receptacles 242 in the edge portion of the "A" modules 240, each configured to receive a protrusion 272 in the edge portion of the "B" modules 270. As shown in FIG. 23, the receptacles 242 are placed on both ends of the edge portion of the module 240. The receptacles 242 may be differently sized, but each includes a substantially rectangular opening 243. Transverse protrusions 246, 247 at the open end of the receptacle extend toward each other from opposite side walls 248, 249. The protrusions 272 on the "B" modules 270 each include a longitudinally extending arm 273 and an enlarged end 274. The arm fits into the space 251 between the protrusions 246, 247, while the enlarged end 274 fits into the opening 243 to prevent separation of the "A" module 240 from the "B" module 270 prior to insertion of a hinge rod into an opening formed in the interleaved hinge elements. The interior faces 256, 257 of the protrusions 246, 247 and the inner face 275 of the enlarged end 274 may be curved. For example, the interior faces 256, 257 may be concave while the inner face 275 may be convex and configured to fit in the curve of the inner faces 256, 257.

The enlarged end 274 includes an opening (not shown) for allowing passage of a hinge rod therethrough. The opening in the enlarged end 274 may be slightly offset towards the interior portion of the module 270 from the hinge openings in the corresponding hinge elements 212. When a hinge rod is inserted into the openings, the enlarged end 274 is pushed away from the protrusions 246, 247 into the rectangular opening 243, preventing interference between these elements during operation of the conveyor belt.

As shown in FIG. 23, the "A" module 240 may include a hinge rod retainer 260, illustrated as a flexible obliquely-extending protrusion extending from the edge 202 into an insertion space 261. The illustrative "A" modules 240 include a hinge rod retainer 260 and insertion space 261 on each end of the edge portion. Corresponding rod openings (not shown) are formed in the edge 202 of the module to allow passage of a hinge rod into the insertion space 261 and hinge openings on the hinge elements 212. The side edge 202 of the "A" module is thus longer than the side edge 203 formed by the "B" module, as shown in FIG. 22.

FIGS. 24A-26B illustrate another embodiment of an alignment guide for aligning two conveyor belt modules prior to insertion of a hinge rod. In the embodiment of FIGS. 24A-C and 25A-B, each end of the "A" module 240' includes an opening 243' in the edge region serving as an alignment guide. Each opening 243' has transverse protrusions 246', 347 at the open end of the receptacle extend toward each other from opposite side walls 248, 249. The protrusion 347 is different from the protrusion 247 in FIGS. 22-24 in that is has a cross-section the shape of a truncated teardrop. The protrusion 347 includes an opening 348 for receiving a hinge rod. The protrusion 246' includes a concave front face 256. The "B" module 270', shown in FIG. 26A-C includes an alignment guide on each end comprising a longitudinally-extending arm 273', a truncated teardrop-shaped protrusion 374 on an outer side and an arc shaped protrusion 375 on the inner side. An opening 276 extends through the truncated teardrop-shaped protrusion 374 and the arm 273 for receiving a hinge rod.

Figure 26A:
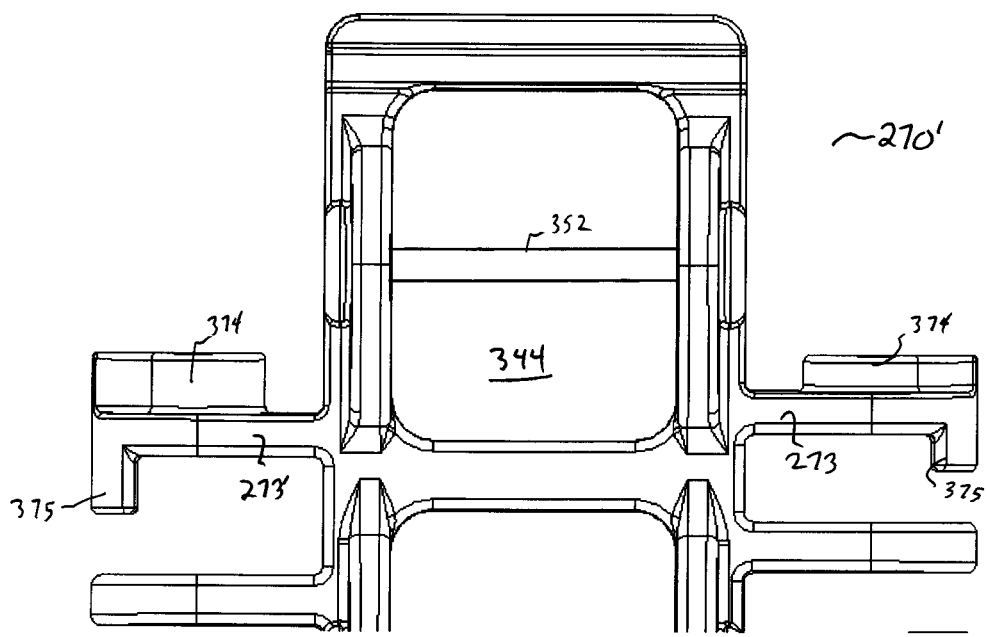
FIGS. 26A-C illustrate a "B" row conveyor belt module that connects to the "A" row conveyor belt module of FIGS. 24A-C.
Figure 26B:
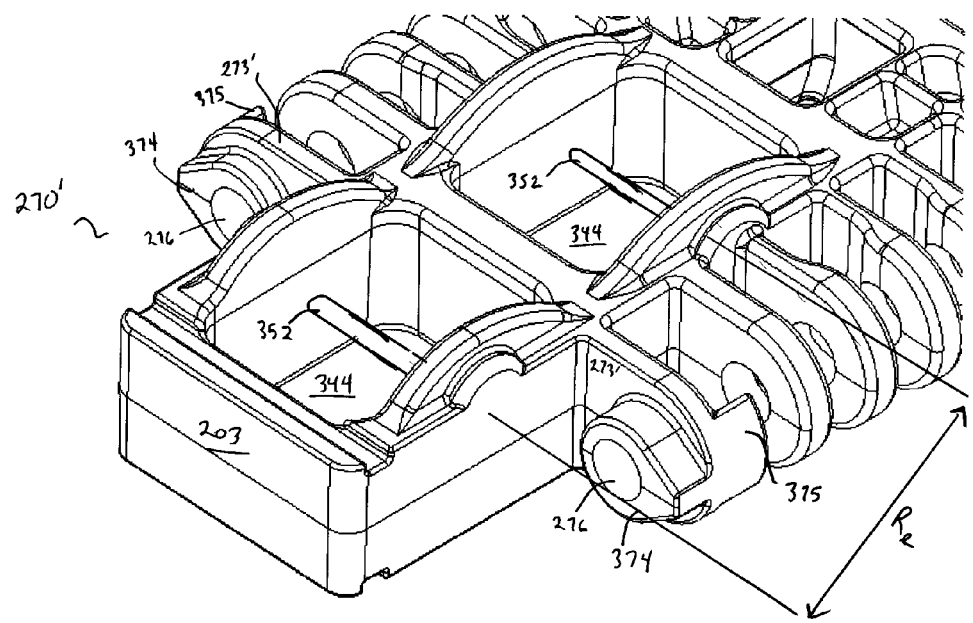
Figure 26C:
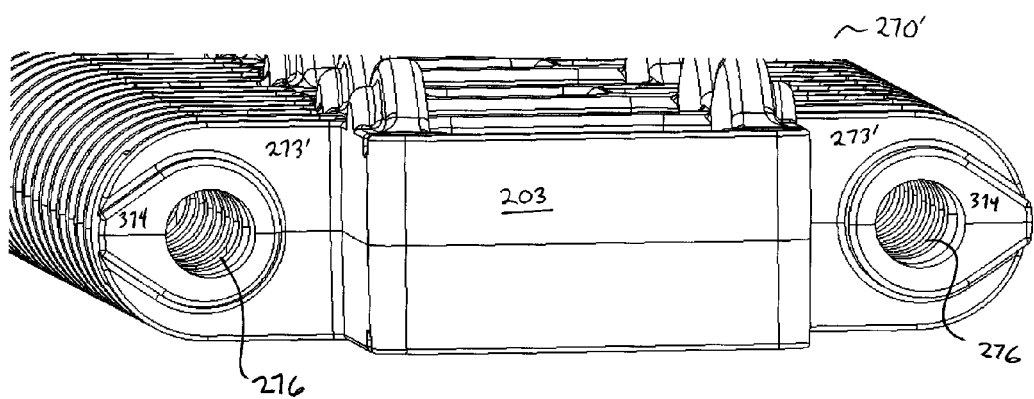

As shown in FIG. 26B, the cavities 344 and axles 352 for receiving rollers are adjacent to each other in the edge region of the "B" module 270', separated by a short separation distance $R_e$ to place two rollers in the vicinity of the edge 203. The cavities and axles in the interior portion are separated by a larger separation distance.

During assembly, prior to insertion of the hinge rod, the "A" modules 240' interleave with the "B" modules 270', such that the interior faces 256 on the "A" module protrusions 246' surface abut the curved surfaces on the protrusions 374 of the "B" modules and the protrusions 375 of the "B" modules receive the protrusions 374 of the "A" modules, thereby aligning the modules. A hinge pin is inserted through hinge openings 380 (shown in FIGS. 24B-25B) in the edge 202, through the hinge rod retainer 260 into the passageway defined by the hinge elements 212. Upon insertion of the hinge pin, the alignment elements 246'374, 375 and 347 may be spaced apart to prevent interference during operation of the conveyor belt.

The present invention has been described relative to certain illustrative embodiments. Since certain changes may be made in the described constructions without departing from the scope of the invention, it is intended that all matter contained in the description or shown in the accompanying drawings be interpreted as illustrative and not in a limiting sense.

What is claimed is:

1. A method of manufacturing a conveyor belt module, comprising the steps of:
   molding an axle having an elongated central portion and an enlarged end portion using a first injection mold;
   removing the first injection mold from the axle; and
   molding an intermediate portion around the axle using a second injection mold to encapsulate the enlarged end portion of the axle and fix the enlarged end portion to the intermediate portion,
   wherein the intermediate portion comprises at least one hinge element on a first end and at least one hinge element on an opposite second end.

2. The method of claim 1, wherein the step of molding the intermediate portion comprises the steps of:
   placing the axle in an axle-receiving recess of the second injection mold;
   closing the second injection mold to encase the axle; and
   injecting a molten thermoplastic material into the second injection mold to form the intermediate portion.

3. The method of claim 2, wherein the step of placing the axle in the axle-receiving recess comprises aligning a groove or a projection on the axle with a projection or groove on the second injection mold.

4. The method of claim 2, wherein the axle includes an anti-rotation groove formed in an end face thereof, and the molten thermoplastic material fills the anti-rotation groove to prevent rotation of the axle relative to the intermediate portion.

5. The method of claim 1, wherein the at least one end of the axle encapsulated in the intermediate portion includes an anti-rotation feature to prevent rotation of the axle relative to the intermediate portion.

6. The method of claim 1, wherein the axle is formed from a first material and the intermediate portion is formed from a second material.

7. The method of claim 6, wherein the first material is nylon.

8. The method of claim 6, wherein the second material is polypropylene.

9. The method of claim 6, wherein the first material is one of polyetheretherketone (PEEK) and polyphenylenesulfide.

10. The method of claim 1, wherein two ends of the axle are encapsulated in the intermediate portion.

11. The method of claim 1, wherein the axle end is encapsulated in a wall defining a cavity in the intermediate portion.

12. A conveyor belt module, comprising:
    an intermediate portion having a first end and an opposite second end defining the length of the intermediate portion, a top side and an opposite bottom side defining the thickness of the intermediate portion, a first edge and an opposite second edge defining the width of the intermediate portion, at least one hinge element on the first end and at least one hinge element on the second end; and
    a molded axle having an elongated central portion and an enlarged first end encapsulated in the intermediate portion and in substantially continuous contact with the intermediate portion.

13. The conveyor belt module of claim 12, wherein the first end of the molded axle comprises rounded lobes separated by a groove formed in an end face of the first end.

14. The conveyor belt module of claim 12, wherein the molded axle includes an alignment guide.

15. The conveyor belt module of claim 14, wherein the alignment guide comprises a peripheral groove formed in a central portion of the axle.

16. The conveyor belt module of claim 12, wherein the molded axle is formed from a first material and the intermediate portion is formed from a second material.

17. The conveyor belt module of claim 16, wherein the first material is nylon.

18. The conveyor belt module of claim 16, wherein the second material is polypropylene.

19. The conveyor belt module of claim 16, wherein the first material is one of polyetheretherketone (PEEK) and polyphenylenesulfide.

20. The conveyor belt module of claim 12, wherein the molded axle extends between a hinge element on the first end and a hinge element on the second end.

21. The conveyor belt module of claim 12, wherein the molded axle extends from a first wall defining a cavity in the intermediate portion.

22. The conveyor belt module of claim 21, wherein the molded axle spans the cavity, such that the first end of the axle is encapsulated in the first wall of the cavity and a second end of the axle is encapsulated in a second wall of the cavity.

23. The conveyor belt module of claim 12, further comprising a first ridge extending upward from the top side along the first end of the intermediate portion between the first and second edges.

24. The conveyor belt module of claim 23, further comprising a protrusion on the first ridge for creating a region for encapsulating the first end of the axle.

25. The conveyor belt module of claim 12, wherein the first end of the molded axle includes an anti-rotation feature for preventing rotation of the molded axle relative to the intermediate portion.

26. The conveyor belt module of claim 12, further comprising a second molded axle separated from the first molded axle by a first separation distance and a third molded axle separated from the second molded axle by a second separation distance that is different from the first separation distance.

27. The conveyor belt module of claim 12, further comprising an alignment guide in the vicinity of the first edge to align the hinge element on the first end with a hinge element of an adjacent conveyor belt module.

28. A molded axle for forming a conveyor belt module, comprising:
    an elongated circular central portion;
    a pair of rounded lobes integrally formed on a first end of the central portion, the rounded lobes separated by a groove; and
    a peripheral groove formed on the central portion for aligning the molded axle in an injection mold.

29. The molded axle of claim 28, further comprising a second pair of rounded lobes integrally formed on a second end of the central portion, the second pair of rounded lobes separated by a groove.

30. The molded axle of claim 28, wherein the central portion and rounded lobes are formed of nylon through an injection molding process.

31. A method of manufacturing a conveyor belt module, comprising the steps of:
    molding an axle using a first injection mold;
    removing the first injection mold from the axle;
    placing the axle in an axle-receiving recess of a second injection mold, such that a groove or projection on the axle aligns with a projection or groove on the second injection mold;
    closing the second injection mold to encase the axle, injecting a molten thermoplastic material into the second injection mold to form an intermediate portion encapsulating a first end of the axle, wherein the intermediate portion comprises at least one hinge element on a first end and at least one hinge element on an opposite second end.

32. A method of manufacturing a conveyor belt module, comprising the steps of:

molding an axle having an anti-rotation groove in an end face using a first injection mold;

removing the first injection mold from the axle;

placing the axle in an axle-receiving recess of a second injection mold, injecting a molten thermoplastic material into the second injection mold to form an intermediate portion encapsulating a first end of the axle, wherein the molten thermoplastic material fills the anti-rotation groove to prevent rotation of the axle relative to the intermediate portion, wherein the intermediate portion comprises at least one hinge element on a first end and at least one hinge element on an opposite second end.

33. A conveyor belt module, comprising:

an intermediate portion having a first end and an opposite second end defining the length of the intermediate portion, a top side and an opposite bottom side defining the thickness of the intermediate portion, a first edge and an opposite second edge defining the width of the intermediate portion, at least one hinge element on the first end and at least one hinge element on the second end; and a molded axle having a first end encapsulated in the intermediate portion and in substantially continuous contact with the intermediate portion, and an alignment guide.

34. The conveyor belt module of claim 33, wherein the alignment guide comprises a peripheral groove formed in a central portion of the axle.

* * * * *